United States Patent
Kakei et al.

(10) Patent No.: US 11,733,464 B2
(45) Date of Patent: Aug. 22, 2023

(54) FIBER STRUCTURE, PULSE LASER DEVICE, AND SUPERCONTINUUM LIGHT SOURCE

(71) Applicant: HAMAMATSU PHOTONICS K.K., Hamamatsu (JP)

(72) Inventors: Ryota Kakei, Hamamatsu (JP); Shin Kato, Hamamatsu (JP); Fumitsugu Fukuyo, Hamamatsu (JP); Tomoya Nakazawa, Hamamatsu (JP); Masaru Shimomaki, Hamamatsu (JP); Shinichi Ohba, Hamamatsu (JP); Yu Matsushiro, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 93 days.

(21) Appl. No.: 17/286,601

(22) PCT Filed: Jul. 11, 2019

(86) PCT No.: PCT/JP2019/027598
§ 371 (c)(1),
(2) Date: Apr. 19, 2021

(87) PCT Pub. No.: WO2020/084844
PCT Pub. Date: Apr. 30, 2020

(65) Prior Publication Data
US 2021/0373246 A1    Dec. 2, 2021

(30) Foreign Application Priority Data
Oct. 26, 2018  (JP) .................... 2018-202248

(51) Int. Cl.
*G02B 6/38*    (2006.01)
*G02F 1/35*    (2006.01)
*G02F 1/365*   (2006.01)

(52) U.S. Cl.
CPC ......... *G02B 6/3803* (2013.01); *G02F 1/3528* (2021.01); *G02F 1/365* (2013.01)

(58) Field of Classification Search
CPC ...... G02B 6/3803; G02F 1/3528; G02F 1/365
See application file for complete search history.

(56) References Cited

U.S. PATENT DOCUMENTS

2004/0258363 A1   12/2004   Shigihara et al.
2006/0198399 A1    9/2006   Jablonski
(Continued)

FOREIGN PATENT DOCUMENTS

| CN | 102439802 B | 2/2014 |
| CN | 105161967 A | 12/2015 |

(Continued)

OTHER PUBLICATIONS

International Preliminary Report on Patentability dated May 6, 2021 for PCT/JP2019/027598.

*Primary Examiner* — Sung H Pak
(74) *Attorney, Agent, or Firm* — Faegre Drinker Biddle & Reath LLP

(57) ABSTRACT

A fiber structure includes first and second optical fibers disposed such that end portions thereof butt, a sheet-shaped saturable absorber including a carbon nanotube and disposed between the end portion of the first optical fiber and the end portion of the second optical fiber, and a housing internally accommodating the end portion of the first optical fiber and the end portion of the second optical fiber. A space in the housing including the saturable absorber is airtight.

18 Claims, 13 Drawing Sheets

(56) References Cited

U.S. PATENT DOCUMENTS

| | | | |
|---|---|---|---|
| 2012/0039344 A1 | 2/2012 | Kian et al. | |
| 2012/0236314 A1 | 9/2012 | Fermann et al. | |
| 2017/0003527 A1 | 1/2017 | Lee et al. | |

FOREIGN PATENT DOCUMENTS

| | | | | |
|---|---|---|---|---|
| JP | 2004252424 A | * | 9/2004 | ........... G02B 6/3849 |
| JP | 2005-010287 A | | 1/2005 | |
| JP | 2005-321483 A | | 11/2005 | |
| JP | 2006-511946 A | | 4/2006 | |
| JP | 2006-511949 A | | 4/2006 | |
| JP | 2007-024942 A | | 2/2007 | |
| JP | 4514130 B2 | | 7/2010 | |
| JP | 2012-199335 A | | 10/2012 | |
| JP | 2005-321733 A | | 1/2015 | |
| JP | 2015-206912 A | | 11/2015 | |
| JP | 2017-067804 A | | 4/2017 | |
| JP | 2017-513591 A | | 6/2017 | |
| KR | 10-2012-0122310 A | | 11/2012 | |
| KR | 20120122310 A | | 11/2012 | |
| WO | WO 2004/059707 A2 | | 7/2004 | |
| WO | WO-2004/059806 A2 | | 7/2004 | |
| WO | WO-2015/160799 A2 | | 10/2015 | |

\* cited by examiner

FIBER STRUCTURE, PULSE LASER DEVICE, AND SUPERCONTINUUM LIGHT SOURCE

TECHNICAL FIELD

One aspect of the present invention relates to a fiber structure, a pulse laser device, and a supercontinuum light source.

BACKGROUND ART

As an example of fiber structure-related techniques of the related art, Patent Literature 1 describes an optical element in which graphene is attached to a fiber end surface as a saturable absorber for a fiber laser.

CITATION LIST

Patent Literature

Patent Literature 1: U.S. Patent Application Publication No. 2012/0039344

SUMMARY OF INVENTION

Technical Problem

In the related art, the life of the saturable absorber is not sufficient and there is room for improvement in terms of durability.

An object of one aspect of the present invention is to provide a fiber structure, a pulse laser device, and a supercontinuum light source capable of enhancing durability.

Solution to Problem

A fiber structure according to one aspect of the present invention includes first and second optical fibers disposed such that end portions thereof butt, a sheet-shaped saturable absorber including a carbon nanotube and disposed between the end portion of the first optical fiber and the end portion of the second optical fiber, and a housing internally accommodating the end portion of the first optical fiber and the end portion of the second optical fiber, in which a space in the housing including the saturable absorber is airtight.

The carbon nanotubes are vulnerable to oxidation. However, in the fiber structure of the present invention, deterioration of the carbon nanotubes in the saturable absorber attributable to oxidation can be suppressed by making the space including the saturable absorber airtight. The life of the saturable absorber can be sufficient, and the durability can be enhanced.

In the fiber structure according to one aspect of the present invention, the housing may have a first housing, and the first housing may be formed of zirconia and have a tubular shape. In this case, it is possible to position the end portion of the first optical fiber and the end portion of the second optical fiber by means of the first housing while keeping the space including the saturable absorber in an airtight state by means of the first housing.

In the fiber structure according to one aspect of the present invention, a space between the first housing and a first ferrule in which the first optical fiber is inserted and a space between the first housing and a second ferrule in which the second optical fiber is inserted may be sealed by a sealing material. In this case, the airtight state of the space including the saturable absorber can be reliably realized by means of the sealing material.

In the fiber structure according to one aspect of the present invention, the housing may have a second housing, and the second housing may be provided with a first tip tube communicating with the space in the second housing including the saturable absorber. In this case, gas or liquid outflow from the airtight space including the saturable absorber or gas or liquid inflow to the airtight space including the saturable absorber is possible via the first tip tube.

In the fiber structure according to one aspect of the present invention, a space between the second housing and a first ferrule in which the first optical fiber is inserted, a space between the second housing and a second ferrule in which the second optical fiber is inserted, and a space between the second housing and the first tip tube may be sealed by a sealing material. In this case, the airtight state of the space including the saturable absorber can be reliably realized by means of the sealing material.

In the fiber structure according to one aspect of the present invention, a space between the second housing and a first ferrule in which the first optical fiber is inserted and a space between the second housing and a second ferrule in which the second optical fiber is inserted may be sealed by an airtight O-ring, and a space between the second housing and the first tip tube may be sealed by a sealing material. In this case, the airtight state of the space including the saturable absorber can be reliably realized by means of the airtight O-ring and the sealing material.

In the fiber structure according to one aspect of the present invention, the second housing may be formed of stainless steel, an aluminum alloy, or a copper alloy. It is possible to enhance the corrosion resistance of the housing and, eventually, the durability.

In the fiber structure according to one aspect of the present invention, the sealing material may be an epoxy adhesive for vacuum airtightness, solder, or a brazing material. The sealing material is capable of functioning as an adhesive by the highly adhesive epoxy adhesive for vacuum airtightness, solder, or brazing material being used as the sealing material.

In the fiber structure according to one aspect of the present invention, at least one of a space between the first housing and a first ferrule in which the first optical fiber is inserted and a space between the first housing and a second ferrule in which the second optical fiber is inserted may be welded. In this case, the airtight state of the space including the saturable absorber can be reliably realized by welding.

In the fiber structure according to one aspect of the present invention, at least one of a space between the second housing and a first ferrule in which the first optical fiber is inserted, a space between the second housing and a second ferrule in which the second optical fiber is inserted, and a space between the second housing and the first tip tube may be welded. In this case, the airtight state of the space including the saturable absorber can be reliably realized by welding.

The fiber structure according to one aspect of the present invention may include an adapter portion provided around the end portion of the first optical fiber and the end portion of the second optical fiber and a first connector portion connecting the first optical fiber to the adapter portion, in which the first connector portion may include a first spring portion pressing the end portion of the first optical fiber to the second optical fiber side. In this case, the thermal diffusion of the saturable absorber sandwiched between the first optical fiber and the second optical fiber can be satisfactory, the life of the saturable absorber can be sufficient, and the durability can be enhanced by the first optical fiber being pressed to the second optical fiber side.

The fiber structure according to one aspect of the present invention may include a second connector portion connecting the second optical fiber to the adapter portion, in which the second connector portion may include a second spring portion pressing the end portion of the second optical fiber to the first optical fiber side. In this case, the thermal diffusion of the saturable absorber sandwiched between the first optical fiber and the second optical fiber can be satisfactory, the life of the saturable absorber can be sufficient, and the durability can be enhanced by the second optical fiber being pressed to the first optical fiber side.

In the fiber structure according to one aspect of the present invention, the housing may have a third housing internally accommodating the adapter portion and the first connector portion, and the third housing may be provided with a second tip tube communicating with the space in the third housing including the saturable absorber. In this case, the space including the saturable absorber can be made airtight with the adapter portion and the first connector portion accommodated in the third housing as they are. In addition, gas or liquid outflow from the airtight space including the saturable absorber or gas or liquid inflow to the airtight space including the saturable absorber is possible via the second tip tube.

In the fiber structure according to one aspect of the present invention, the saturable absorber may contain a sheet-shaped resin material and a plurality of the carbon nanotubes dispersed in the resin material. In this case, the resin material has high air permeability, and thus the above-described action and effect of suppressing carbon nanotube deterioration attributable to oxidation are noticeable.

In the fiber structure according to one aspect of the present invention, the space including the saturable absorber may be filled with an inert gas or an inert liquid. As a result, the deterioration of the carbon nanotubes in the saturable absorber can be further suppressed and the durability can be further enhanced.

In the fiber structure according to one aspect of the present invention, the inert gas may be $N_2$ or a rare gas and the inert liquid may be a fluorine-based inert liquid. In this case, the above-described action and effect of suppressing the deterioration of the carbon nanotubes in the saturable absorber can be effectively realized.

A pulse laser device according to one aspect of the present invention includes the fiber structure. The durability can be enhanced in the pulse laser device as well as the fiber structure.

A supercontinuum light source according to one aspect of the present invention includes the pulse laser device. The durability can be enhanced in the supercontinuum light source as well as the fiber structure.

Advantageous Effects of Invention

According to one aspect of the present invention, it is possible to provide a fiber structure, a pulse laser device, and a supercontinuum light source capable of enhancing durability.

DESCRIPTION OF EMBODIMENTS

Figure 1:
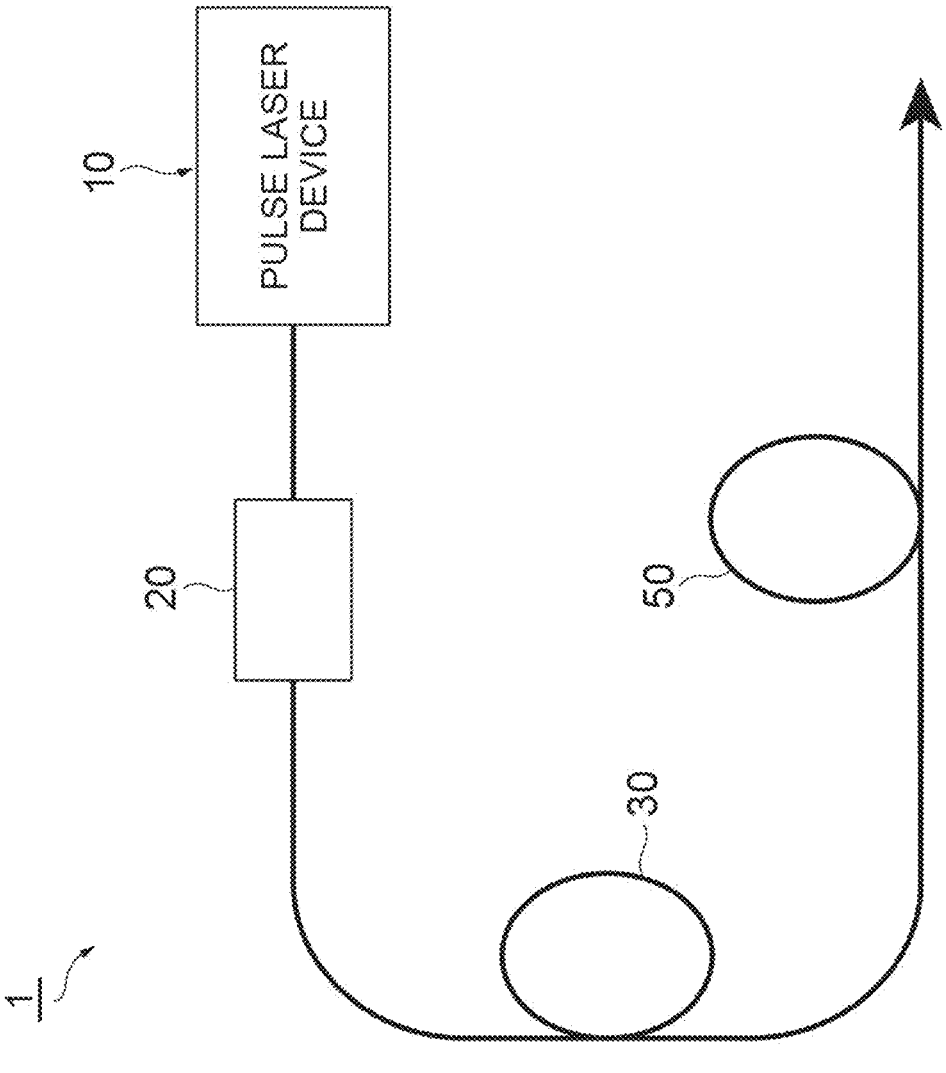
FIG. 1 is a schematic configuration diagram illustrating a supercontinuum light source according to a first embodiment.

Hereinafter, embodiments will be described in detail with reference to the drawings. In the following description, the same or equivalent elements will be denoted by the same reference numerals with redundant description omitted.

First Embodiment

As illustrated in FIG. 1, a supercontinuum light source 1 is a light source generating supercontinuum light. The supercontinuum light source 1 includes a pulse laser device 10, a fiber amplifier 20, a pulse compression fiber 30, and a highly non-linear optical fiber 50.

The pulse laser device 10 is a ring-type laser oscillator. Details of the pulse laser device 10 will be described later. The output end of the pulse laser device 10 is connected to the fiber amplifier 20. The output end of the fiber amplifier 20 is connected to the pulse compression fiber 30. The output end of the pulse compression fiber 30 is connected to the highly non-linear optical fiber 50. The highly non-linear optical fiber 50 is a highly non-linear fiber generating supercontinuum light. The highly non-linear optical fiber 50 expands the spectral width of input pulsed light by the non-linear optical effect and converts it into supercontinuum light. The supercontinuum light is output from the output end of the highly non-linear optical fiber 50.

Figure 2:
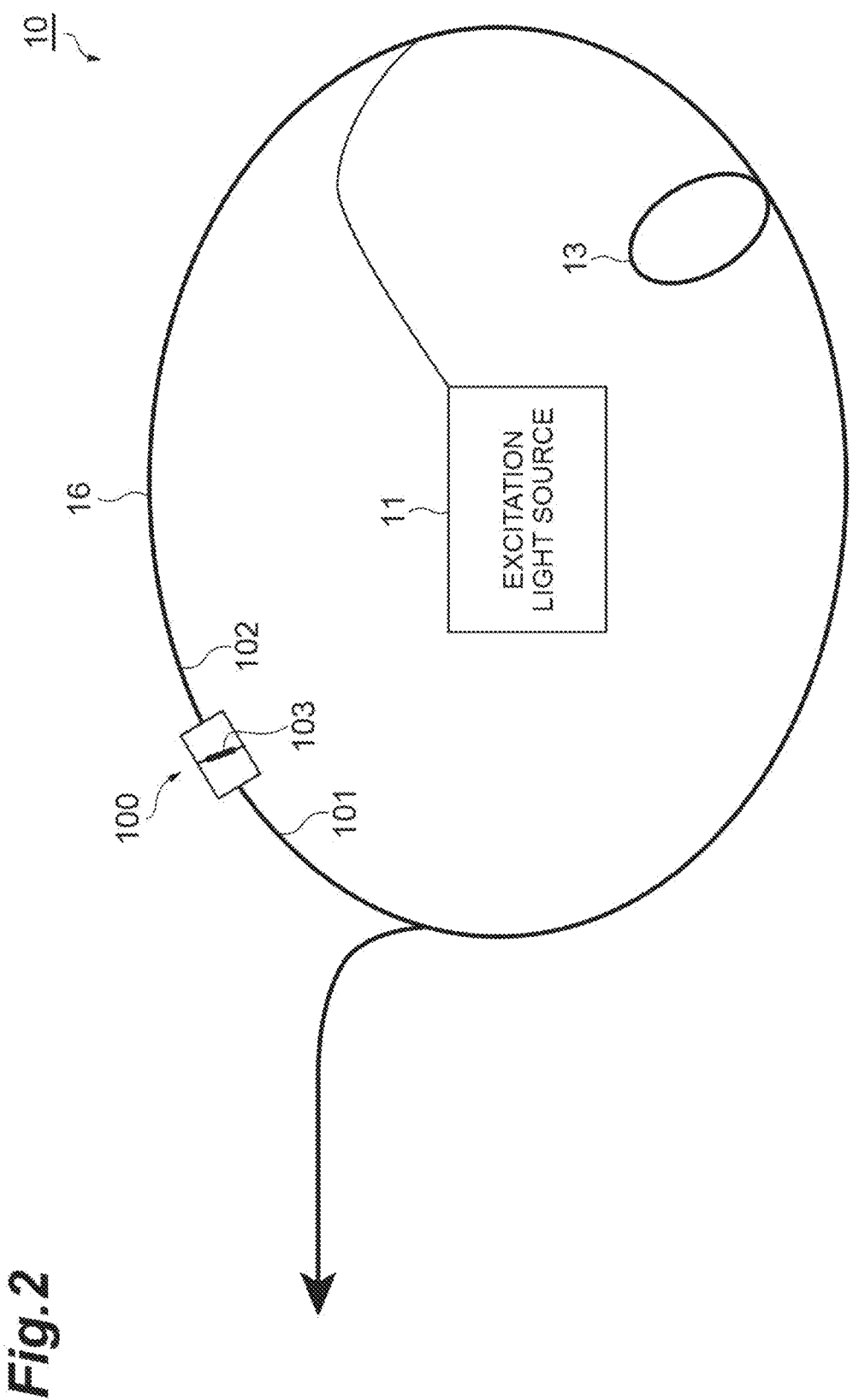
FIG. 2 is a schematic configuration diagram illustrating a pulse laser device of FIG. 1.

As illustrated in FIG. 2, the pulse laser device 10 constitutes an ultra-short pulse (femtosecond) laser device. The pulse laser device 10 includes an excitation light source 11, an amplification optical fiber 13, and a fiber structure 100. The excitation light source 11 where the fiber structure 100 is disposed on the optical path of an optical fiber 16 configured in a loop shape is, for example, a laser diode. Continuous light from the excitation light source 11 is input to the amplification optical fiber 13 and circulates in only one direction. The fiber structure 100 is a structure including a saturable absorber 103. Details of the fiber structure 100 will be described later.

The saturable absorber 103 is a material, and the light transparency of the material changes depending on the intensity of incident light. The saturable absorber 103 absorbs the incident light in a linear region where the incident light intensity is weak. When the incident light intensity reaches a high level, the absorption of the saturable absorber 103 decreases and the incident light is transmitted through the saturable absorber 103. In the pulse laser device 10, the amplitude of oscillating laser light fluctuates at a high frequency with time due to a noise component, and thus light with a high level of incident light intensity is transmitted without being absorbed by the saturable absorber 103 and becomes pulsed light. The pulsed light is superposed on continuous light circulating in a ring-type resonator, the intensity is increased by stimulated emission being promoted, and the transmission of the pulsed light through the saturable absorber 103 becomes more likely. While the pulsed light circulates in the ring-type resonator while growing in this manner, the saturable absorption characteristics of the saturable absorber 103, the fiber non-linear effect, and the wavelength dispersion effect result in pulsed light generation. The generated optical pulse is separated and output.

Figure 3:
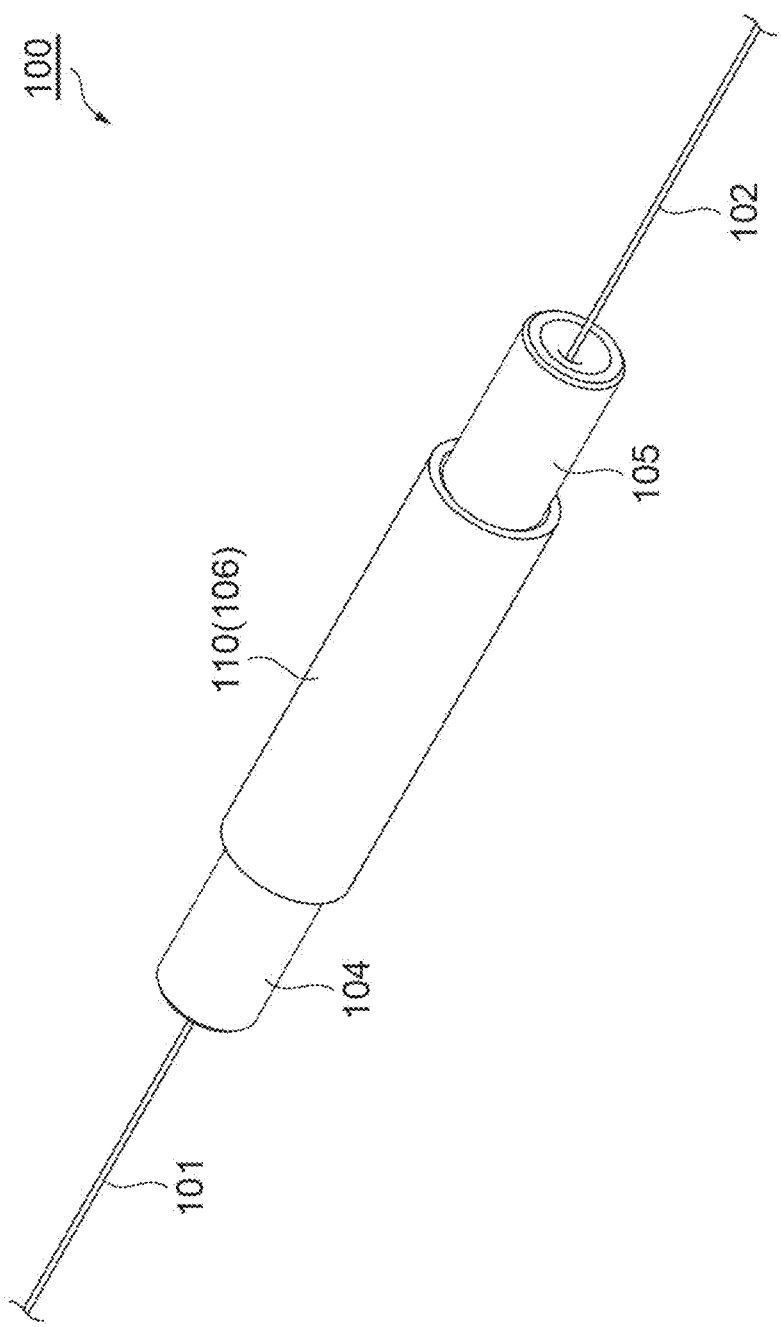
FIG. 3 is a perspective view illustrating a fiber structure of FIG. 1.
Figure 4:
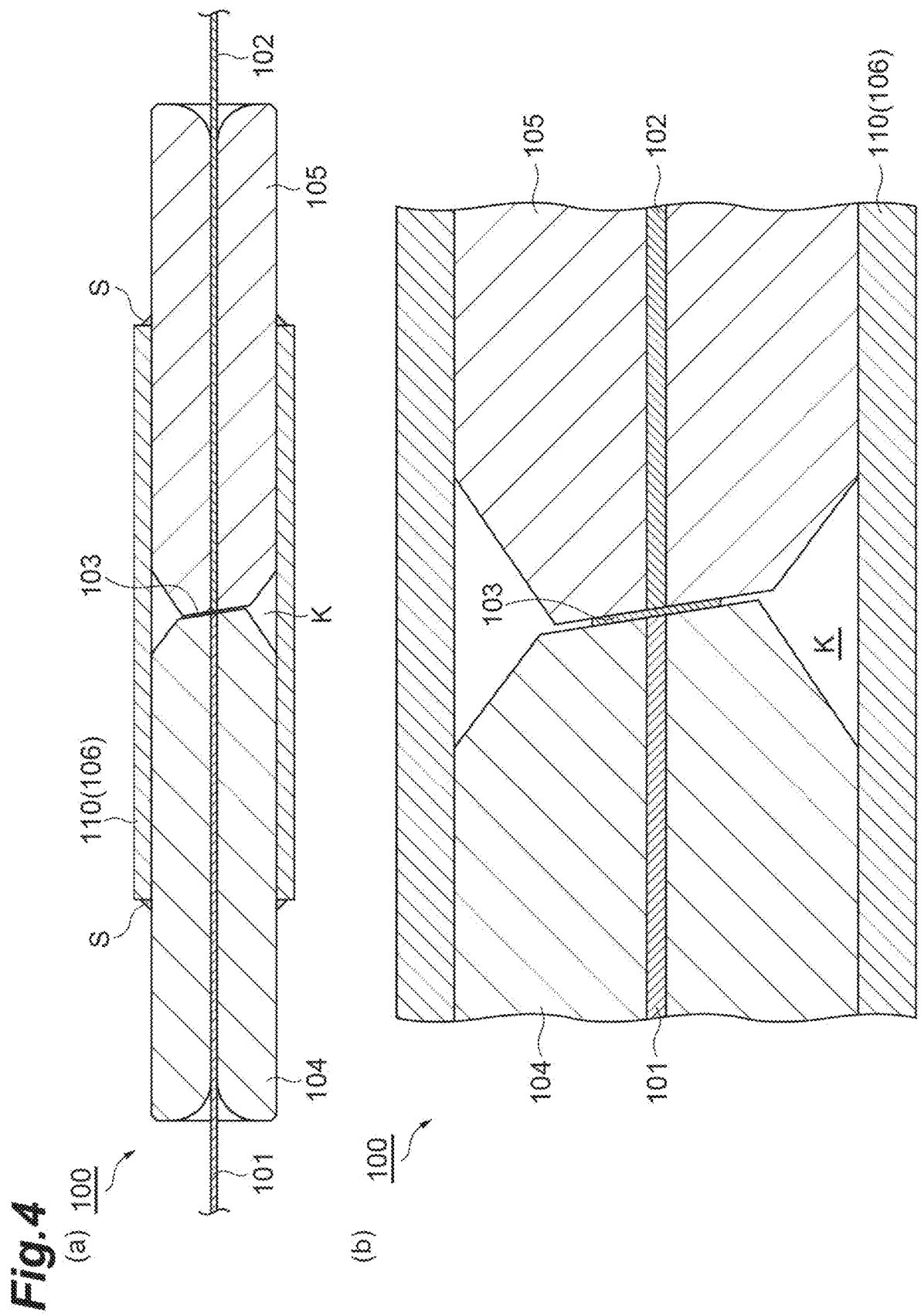
FIG. 4(a) is a vertical cross-sectional view illustrating the fiber structure of FIG. 3.
FIG. 4(b) is an enlarged vertical cross-sectional view illustrating a part of FIG. 4(a).

Next, the fiber structure 100 will be specifically described. As illustrated in FIGS. 3 and 4, the fiber structure 100 includes a first optical fiber 101, a second optical fiber 102, the saturable absorber 103, a first ferrule 104, a second ferrule 105, and a housing 106. The first optical fiber 101 and the second optical fiber 102 are single-mode fibers. The first optical fiber 101 and the second optical fiber 102 have end portions disposed so as to butt. The first optical fiber 101 and the second optical fiber 102 have end surfaces facing each other.

The saturable absorber 103 is disposed between the end portion of the first optical fiber 101 and the end portion of the second optical fiber 102. The saturable absorber 103 is sandwiched between the end surface of the first optical fiber 101 and the end surface of the second optical fiber 102. The saturable absorber 103 is a sheet-shaped sheet body containing carbon nanotubes. The saturable absorber 103 has a circular sheet shape. The saturable absorber 103 is a material for ultra-short pulse laser device mode lock.

The saturable absorber 103 contains a sheet-shaped resin material and the plurality of carbon nanotubes dispersed in the resin material. A material having excellent heat resistance is used as the resin material. The carbon nanotubes have the saturable absorption characteristics of absorbing light in the 1,560 nm band and the absorption decreasing when the incident light intensity reaches a high level.

The first ferrule 104 is a cylindrical body formed of ceramics, and the end portion of the first optical fiber 101 is inserted in the first ferrule 104. The first ferrule 104 is configured such that its end surface is the same as the end surface of the first optical fiber 101. The end surface of the first ferrule 104 is inclined with respect to a plane orthogonal to the axial direction of the first optical fiber 101.

The second ferrule 105 is a cylindrical body formed of ceramics, and the end portion of the second optical fiber 102 is inserted in the second ferrule 105. The second ferrule 105 is configured such that its end surface is the same as the end surface of the second optical fiber 102. The end surface of the second ferrule 105 is inclined with respect to a plane orthogonal to the axial direction of the second optical fiber 102.

The end surface of the first ferrule 104 and the end surface of the second ferrule 105 face each other. The first ferrule 104 and the second ferrule 105 are fixed to the housing 106 in a state of being pressed in the direction of mutual approach. As a result, the end portion of the first optical fiber 101 and the end portion of the second optical fiber 102 are pressed in the direction of mutual approach. The saturable absorber 103 is sandwiched by and between the end surface of the first ferrule 104 and the end surface of the second ferrule 105. "Pressing" means pressing by applying force.

The housing 106 has a sleeve (first housing) 110. The sleeve 110 has a circular tube shape. The sleeve 110 is formed of zirconia. The sleeve 110 internally accommodates the end portion of the first optical fiber 101 and the end portion of the second optical fiber 102. The sleeve 110 fits with the end portion of the first ferrule 104. The sleeve 110 fits with the end portion of the second ferrule 105. The sleeve 110 holds the end portion of the first optical fiber 101 and the end portion of the second optical fiber 102 and easily realizes axial and angular alignment for the end portions.

The space between the sleeve 110 and the first ferrule 104 in which the first optical fiber 101 is inserted is bonded and sealed by a sealing material S, and the space between the sleeve 110 and the second ferrule 105 in which the second optical fiber 102 is inserted is bonded and sealed by the sealing material S. The sealing material S is, for example, solder, a brazing material, or an epoxy adhesive for vacuum airtightness having a function as an adhesive.

A space K in the sleeve 110 includes the saturable absorber 103 sandwiched between the first optical fiber 101 and the second optical fiber 102 and is in an airtight state. The space K is defined by the inner surface of the sleeve 110, the end portion of the first optical fiber 101, and the end portion of the second optical fiber 102. The space K is around the saturable absorber 103. In the space K, the saturable absorber 103 is pressed by the end surfaces of the first optical fiber 101 and the first ferrule 104 and the end surfaces of the second optical fiber 102 and the second ferrule 105. The pressing force is, for example, 500 gf to 1 kgf. The space K is filled with an inert gas or an inert liquid. The inert gas is $N_2$ (nitrogen) or a rare gas. The rare gas is Xe (xenon), Ar (argon), or the like. The inert liquid is a fluorine-based inert liquid.

When the fiber structure 100 is produced, the first ferrule 104 to which the first optical fiber 101 is attached is inserted into the sleeve 110 and the second ferrule 105 to which the second optical fiber 102 is attached is inserted into the sleeve 110 in an inert gas or inert liquid atmosphere. Then, the saturable absorber 103 is sandwiched between the end surfaces thereof and sealing is performed by applying the sealing material S while pressing the first ferrule 104 and the second ferrule 105 from both ends. As a result, the space K around the saturable absorber 103 is maintained in an airtight state and an inert gas or inert liquid atmosphere.

As described above, in the fiber structure 100, the pulse laser device 10, and the supercontinuum light source 1, the carbon nanotubes are vulnerable to oxidation. However, deterioration of the carbon nanotubes in the saturable absorber 103 attributable to oxidation can be suppressed by making the space K including the saturable absorber 103 airtight. The life of the saturable absorber 103 can be sufficient, and the durability can be enhanced.

Figure 5:
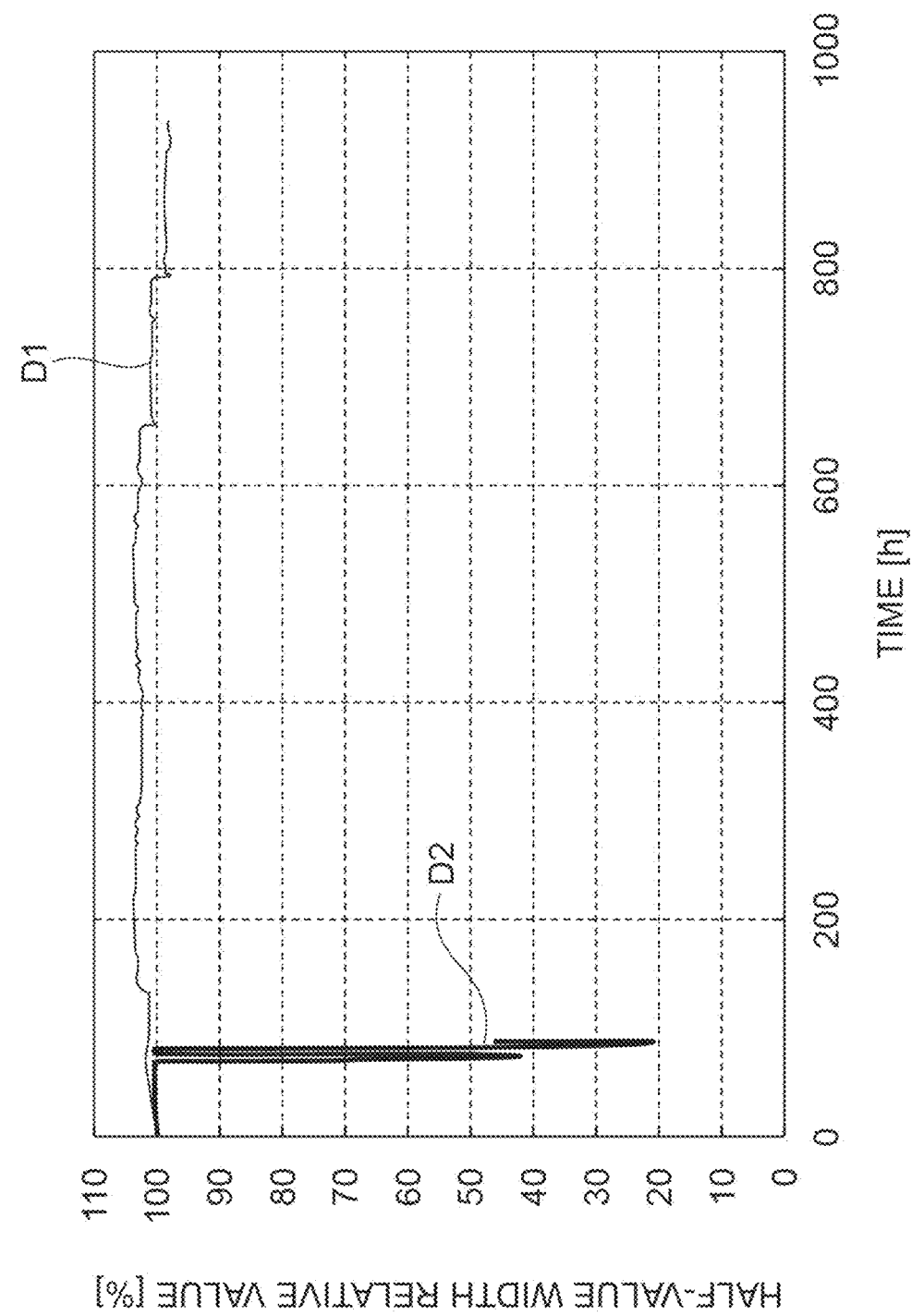
FIG. 5 is a graph showing a durability test result pertaining to the fiber structure of FIG. 3.

FIG. 5 is a graph showing a durability test result pertaining to the fiber structure 100. In the drawing, the horizontal axis represents continuous operation time. The vertical axis represents the relative half-value width of the spectrum (half-value width relative value), which is a value at a time when the half-value width at a time when the continuous operation time is 0 hours is 100%. In the durability test, the half-value width of the spectrum sharply narrows when a decline in performance occurs, and thus life characteristics can be determined from the half-value width relative value.

As shown in FIG. 5, performance data D1 pertaining to the fiber structure 100 shows that the performance can be maintained for a long time. On the other hand, performance data D2 pertaining to a fiber structure in which the saturable absorber 103 is in the air atmosphere shows that the performance sharply deteriorates when the continuous operation time is 65 hours. It can be confirmed that the durability and the life characteristics can be significantly improved by means of the fiber structure 100.

The fiber structure 100, the pulse laser device 10, and the supercontinuum light source 1 include the tubular sleeve 110 formed of zirconia as the housing 106. With the sleeve 110, it is possible to position the end portion of the first optical fiber 101 and the end portion of the second optical fiber 102 while keeping the space K including the saturable absorber 103 in an airtight state.

In the fiber structure 100, the pulse laser device 10, and the supercontinuum light source 1, the space between the sleeve 110 and the first ferrule 104 is sealed by the sealing material S and the space between the sleeve 110 and the second ferrule 105 is sealed by the sealing material S. In this case, the airtight state of the space K including the saturable absorber 103 can be reliably realized by means of the sealing material S.

In the fiber structure 100, the pulse laser device 10, and the supercontinuum light source 1, the sealing material S is an epoxy adhesive for vacuum airtightness, solder, or a brazing material. The sealing material S is capable of functioning as an adhesive by the highly adhesive epoxy adhesive for vacuum airtightness, solder, or brazing material being used as the sealing material S. It is possible to seal the space K while bonding the sleeve 110 and the first ferrule 104 and bonding the sleeve 110 and the second ferrule 105. The epoxy adhesive for vacuum airtightness, solder, or brazing material can be appropriately selected and used in accordance with the base material.

In the fiber structure 100, the pulse laser device 10, and the supercontinuum light source 1, the saturable absorber 103 contains the sheet-shaped resin material and the plurality of carbon nanotubes dispersed in the resin material. In this case, the resin material has high air permeability, and thus the above-described action and effect of suppressing carbon nanotube deterioration attributable to oxidation are noticeable.

In the fiber structure 100, the pulse laser device 10, and the supercontinuum light source 1, the space K including the saturable absorber 103 is filled with an inert gas or an inert liquid. As a result, the deterioration of the carbon nanotubes in the saturable absorber 103 can be further suppressed and the durability can be further enhanced.

In the fiber structure 100, the pulse laser device 10, and the supercontinuum light source 1, the inert gas is $N_2$ or a rare gas and the inert liquid is a fluorine-based inert liquid. In this case, the above-described action and effect of suppressing the deterioration of the carbon nanotubes in the saturable absorber 103 can be effectively realized.

In the fiber structure 100, the pulse laser device 10, and the supercontinuum light source 1, the saturable absorber 103 is pressed by the end surface of the first ferrule 104 and the end surface of the second ferrule 105. As a result, the thermal diffusion of the saturable absorber 103 can be satisfactory, the life of the saturable absorber 103 can be sufficient, and the durability can be enhanced.

Second Embodiment

Next, a second embodiment will be described. Differences from the first embodiment will be described in the description of the present embodiment.

Figure 6:
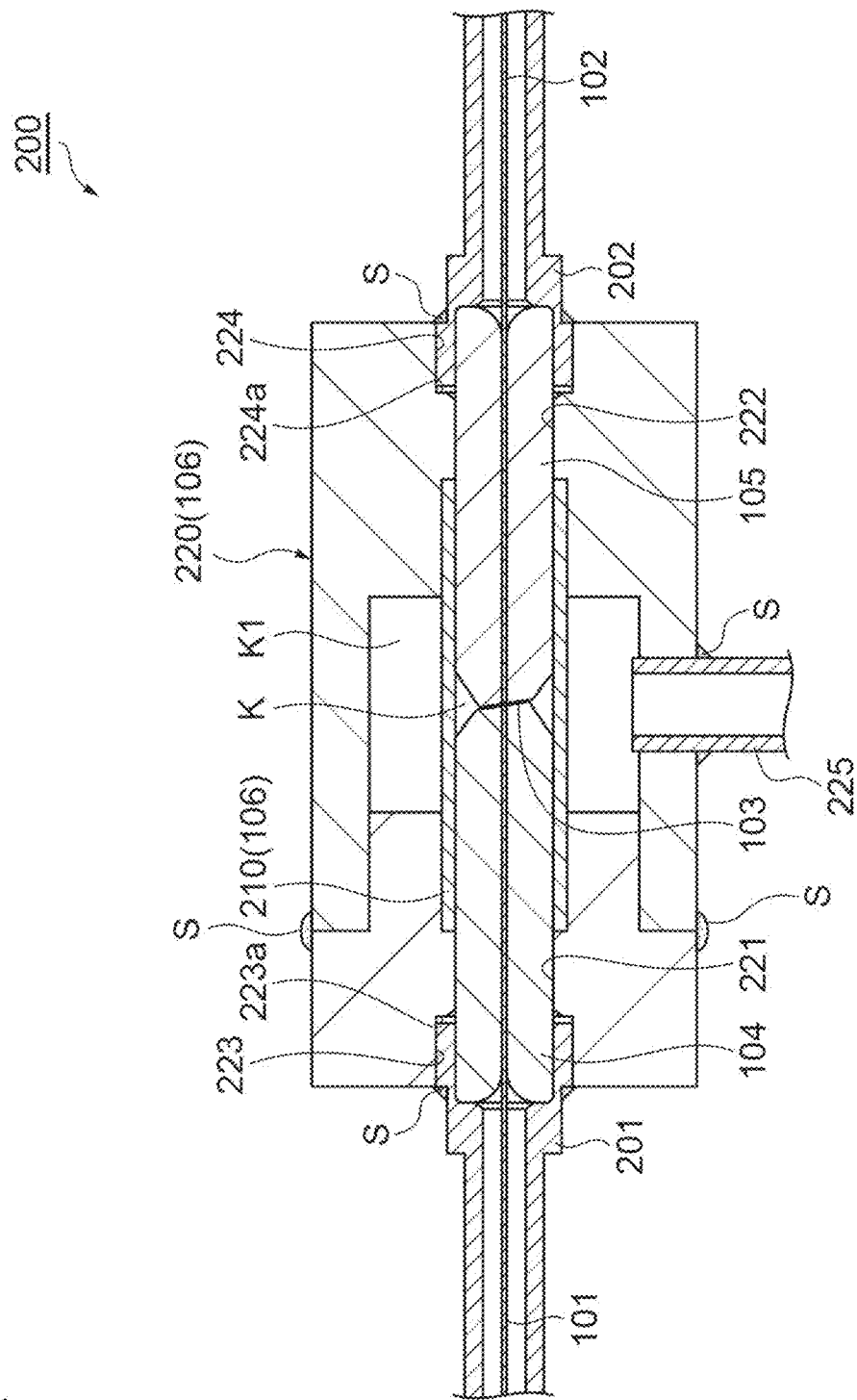
FIG. 6 is a vertical cross-sectional view illustrating a fiber structure according to a second embodiment.

As illustrated in FIG. 6, a fiber structure 200 of the present embodiment includes a sleeve 210 instead of the sleeve 110 (see FIG. 4). The sleeve 210 is a split sleeve having a C-shaped cross section. An axially extending slit is formed in the sleeve 210. The sleeve 210 has an elastic force tightening the end portions of the first ferrule 104 and the second ferrule 105 inserted therein. The space K in the sleeve 210 communicates with the outside of the sleeve 210 via the slit.

The fiber structure 200 further includes a circular tube-shaped first ferrule holding portion 201 and a circular tube-shaped second ferrule holding portion 202. The first ferrule holding portion 201 holds the first ferrule 104. The first ferrule holding portion 201 is coaxially attached to the base end side of the first ferrule 104. The inner portion of the first ferrule holding portion 201 communicates with the inner portion of the first ferrule 104. The second ferrule holding portion 202 holds the second ferrule 105. The second ferrule holding portion 202 is coaxially attached to the base end side of the second ferrule 105. The inner portion of the second ferrule holding portion 202 communicates with the inner portion of the second ferrule 105.

The housing 106 of the fiber structure 200 further has an elongated package 220 as a second housing. The package 220 has a divided structure in which a plurality of members are fitted together. The fitting part is bonded and sealed by the sealing material S. The package 220 is formed of stainless steel, an aluminum alloy, or a copper alloy. A space K1 is formed in the package 220. The space K1 of the package 220 is in an airtight state. The space K1 is defined by the inner surface of the package 220 and the outer surface of the sleeve 210.

The space K1 includes the space K in the sleeve 210. The space K1 communicates with the space K via the above-described slit of the sleeve 210. The space K1 includes the saturable absorber 103 in the package 220. The space K1 constitutes the space around the saturable absorber 103.

Through holes 221 and 222 communicating with the space K1 are formed along the longitudinal direction in the package 220. With the middle portion of the sleeve 210 positioned in the space K1, one end portion and the other end portion of the sleeve 210 are fitted in the through holes 221 and 222, respectively. The first ferrule 104 is inserted in the through hole 221. The second ferrule 105 is inserted in the through hole 222.

The through hole 221 has an end portion that includes an opening 223 increased in diameter via a step. The first ferrule holding portion 201 is inserted in the opening 223. With the first ferrule holding portion 201 inserted, a bottom surface 223a of the opening 223 is separated from the end surface of the first ferrule holding portion 201 (has a gap with respect to the end surface). The through hole 222 has an end portion that includes an opening 224 increased in diameter via a step. The second ferrule holding portion 202 is inserted in the opening 224. With the second ferrule holding portion 202 inserted, a bottom surface 224a of the opening 224 is separated from the end surface of the second ferrule holding portion 202 (has a gap with respect to the end surface).

A first tip tube 225 extending along a direction intersecting with the longitudinal direction is joined to the package 220. The first tip tube 225 communicates with the space K1.

The first tip tube 225 is a glass or metal tube used when gas is discharged from the space K1 (the space K1 is vacuumized) and when the space K1 is filled with an inert gas or liquid. The first tip tube 225 is blocked such that the space K1 is in an airtight state.

The space between the package 220 and the first ferrule holding portion 201 (that is, between the package 220 and the first ferrule 104) is bonded and sealed by the sealing material S. The space between the package 220 and the second ferrule holding portion 202 (that is, between the package 220 and the second ferrule 105) is bonded and sealed by the sealing material S. The space between the package 220 and the first tip tube 225 is bonded and sealed by the sealing material S.

Figure 7:
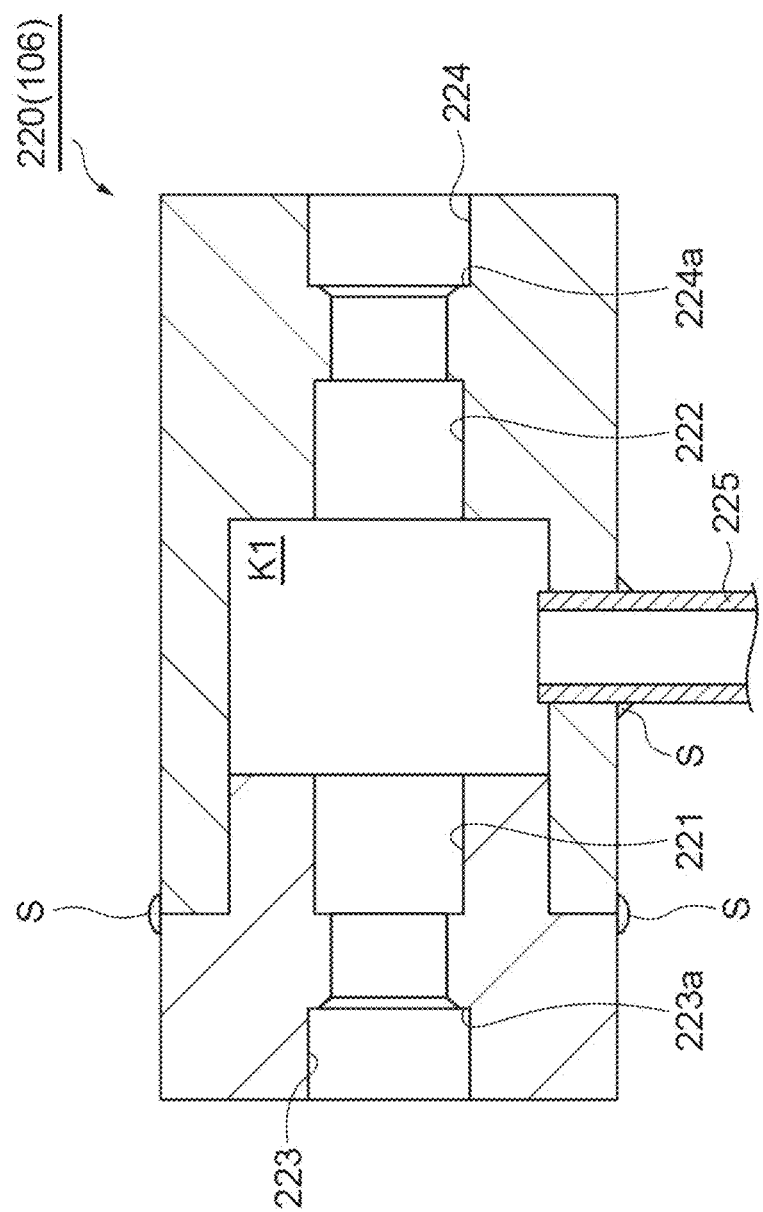
FIG. 7 is a diagram illustrating a method for producing the fiber structure of FIG. 6.

When the fiber structure 200 is produced, the saturable absorber 103 is prepared first. As illustrated in FIG. 7, the plurality of members are fitted together, the fitting part is bonded and sealed by the sealing material S, and then the package 220 is formed. The first tip tube 225 is joined to the package 220, and the space between the package 220 and the first tip tube 225 is bonded and sealed by the sealing material S.

Figure 8:
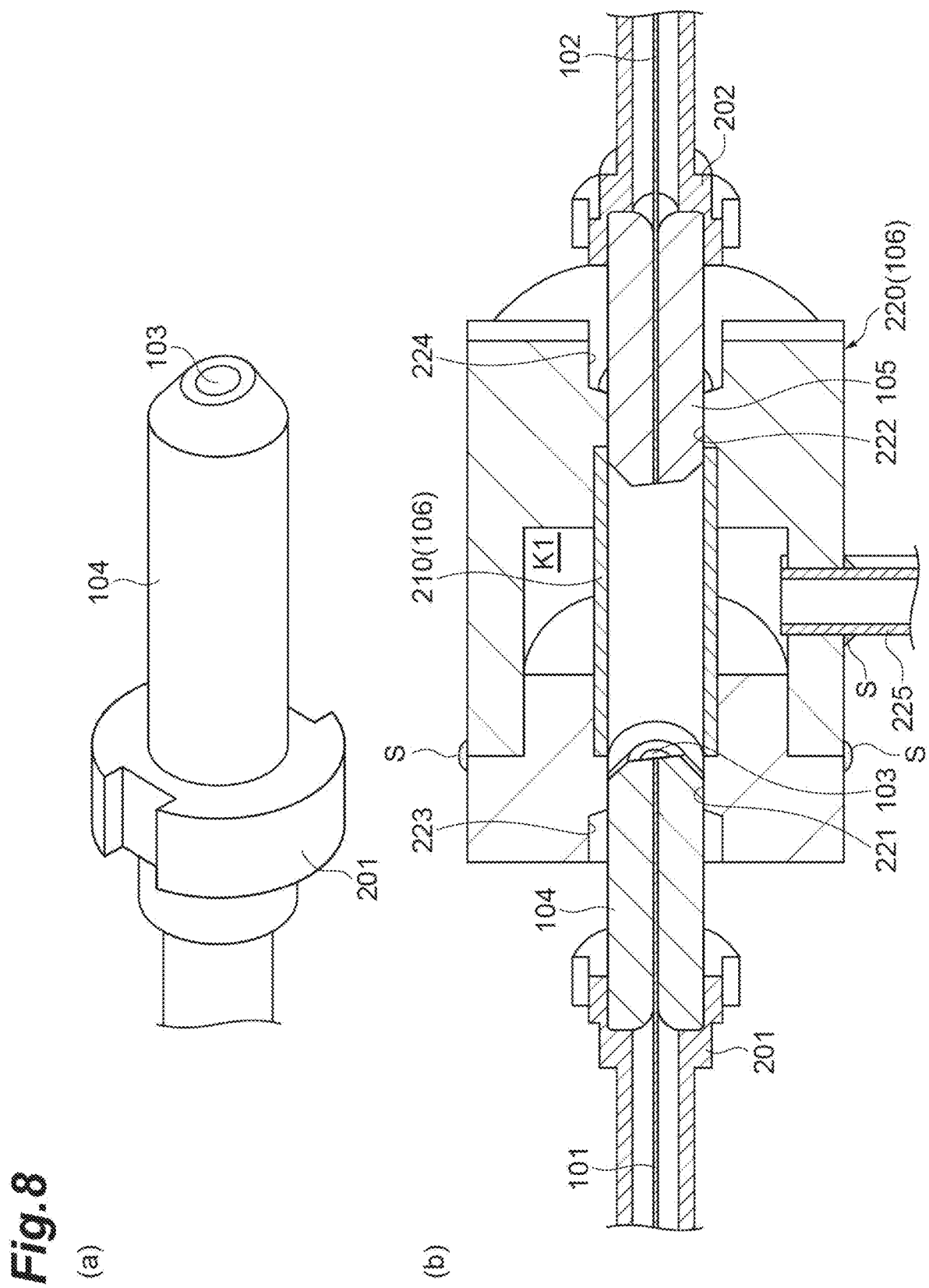
FIG. 8(a) is a diagram illustrating a continuation of FIG. 7.
FIG. 8(b) is a diagram illustrating a continuation of FIG. 8(a).

As illustrated in FIG. 8(a), the saturable absorber 103 is placed on the end surface of the first ferrule 104. In this state, the first ferrule 104 is inserted into the through hole 221 of the package 220 and the second ferrule 105 is inserted into the through hole 222 of the package 220 as illustrated in FIG. 8(b). The end surface of the first ferrule 104 and the end surface of the second ferrule 105 sandwich the saturable absorber 103 at a position in the space K1.

Figure 9:
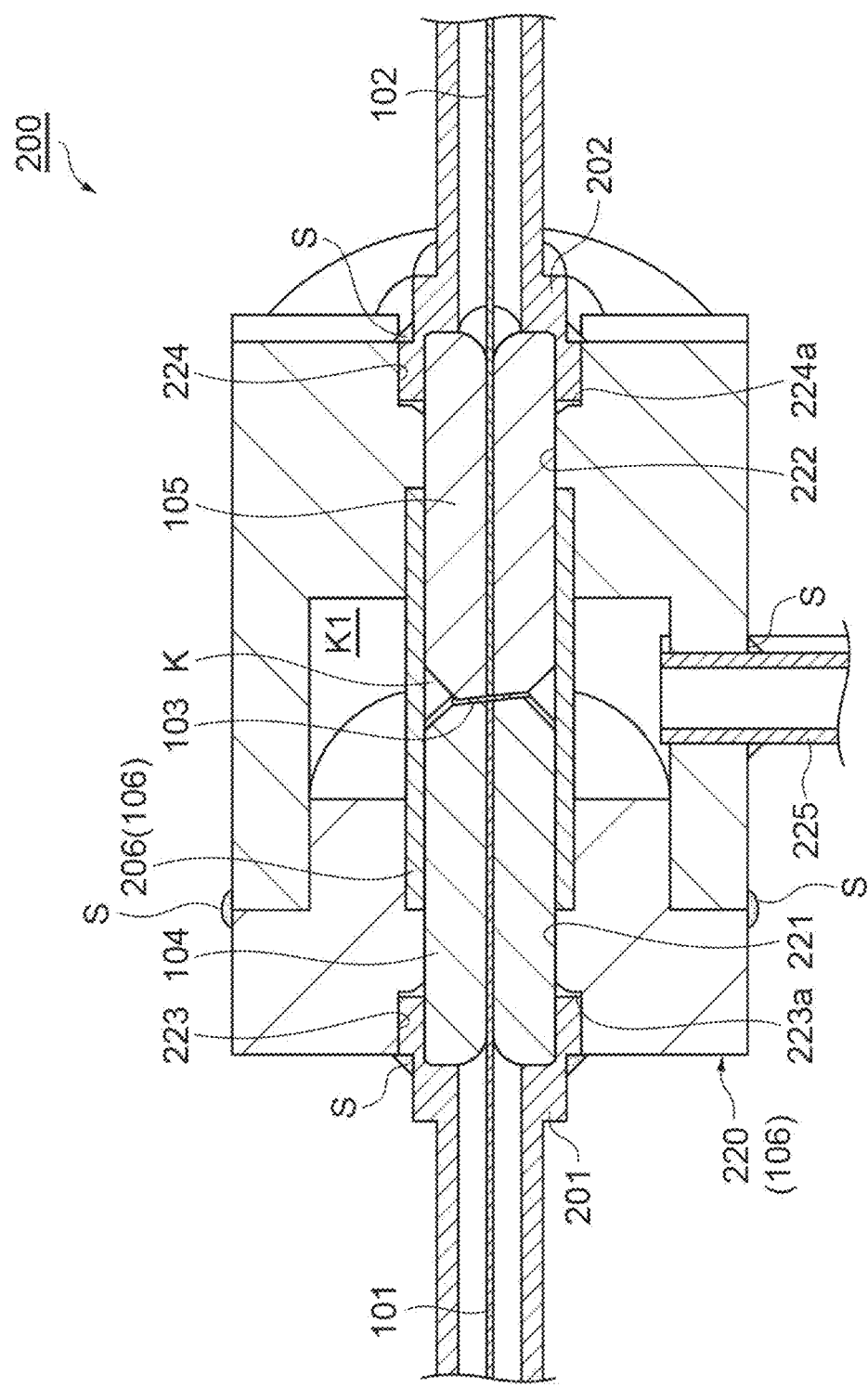
FIG. 9 is a diagram illustrating a continuation of FIG. 8(b).

As illustrated in FIG. 9, the first ferrule 104 and the second ferrule 105 are pressed so as to approach each other. In this pressed state, the space between the package 220 and the first ferrule holding portion 201 is bonded and sealed by the sealing material S and the space between the package 220 and the second ferrule holding portion 202 is bonded and sealed by the sealing material S. The first tip tube 225 is attached to an exhaust stand, and the space K1 is vacuumized via the first tip tube 225. Then, a part of the first tip tube 225 is removed and blocked.

As described above, the life of the saturable absorber 103 can be sufficient and the durability can be enhanced also in the fiber structure 200.

In the fiber structure 200, the housing 106 has the package 220 and the package 220 is provided with the first tip tube 225. As a result, gas or liquid outflow from the airtight space K1 (space K) or gas or liquid inflow to the airtight space K1 (space K) is possible via the first tip tube 225.

In the fiber structure 200, the space between the package 220 and the first ferrule 104, the space between the package 220 and the second ferrule 105, and the space between the package 220 and the first tip tube 225 are sealed by the sealing material S. In this case, the airtight state of the space K1 including the saturable absorber 103 can be reliably realized by means of the sealing material S.

In the fiber structure 200, the package 220 is formed of stainless steel, an aluminum alloy, or a copper alloy. As a result, it is possible to enhance the corrosion resistance of the package 220 and, eventually, the durability.

By the way, when the first ferrule 104 is pressed to the second ferrule 105 side, it is difficult to further press the first ferrule 104 if the first ferrule 104 and the package 220 are already in contact (mechanical interference). In other words, a gap between the package 220 and the first ferrule 104 (or the first ferrule holding portion 201) is necessary in order to realize the pressing. The same applies to the second ferrule 105.

In this regard, in the fiber structure 200, a gap is formed between the package 220 (bottom surface 223a of the opening 223) and the end surface of the first ferrule holding portion 201. A gap is formed between the package 220 (bottom surface 224a of the opening 224) and the end surface of the second ferrule holding portion 202. As a result, the first ferrule 104 and the second ferrule 105 can be pressed against each other.

Third Embodiment

Next, a third embodiment will be described. Differences from the first embodiment will be described in the description of the present embodiment.

Figure 10:
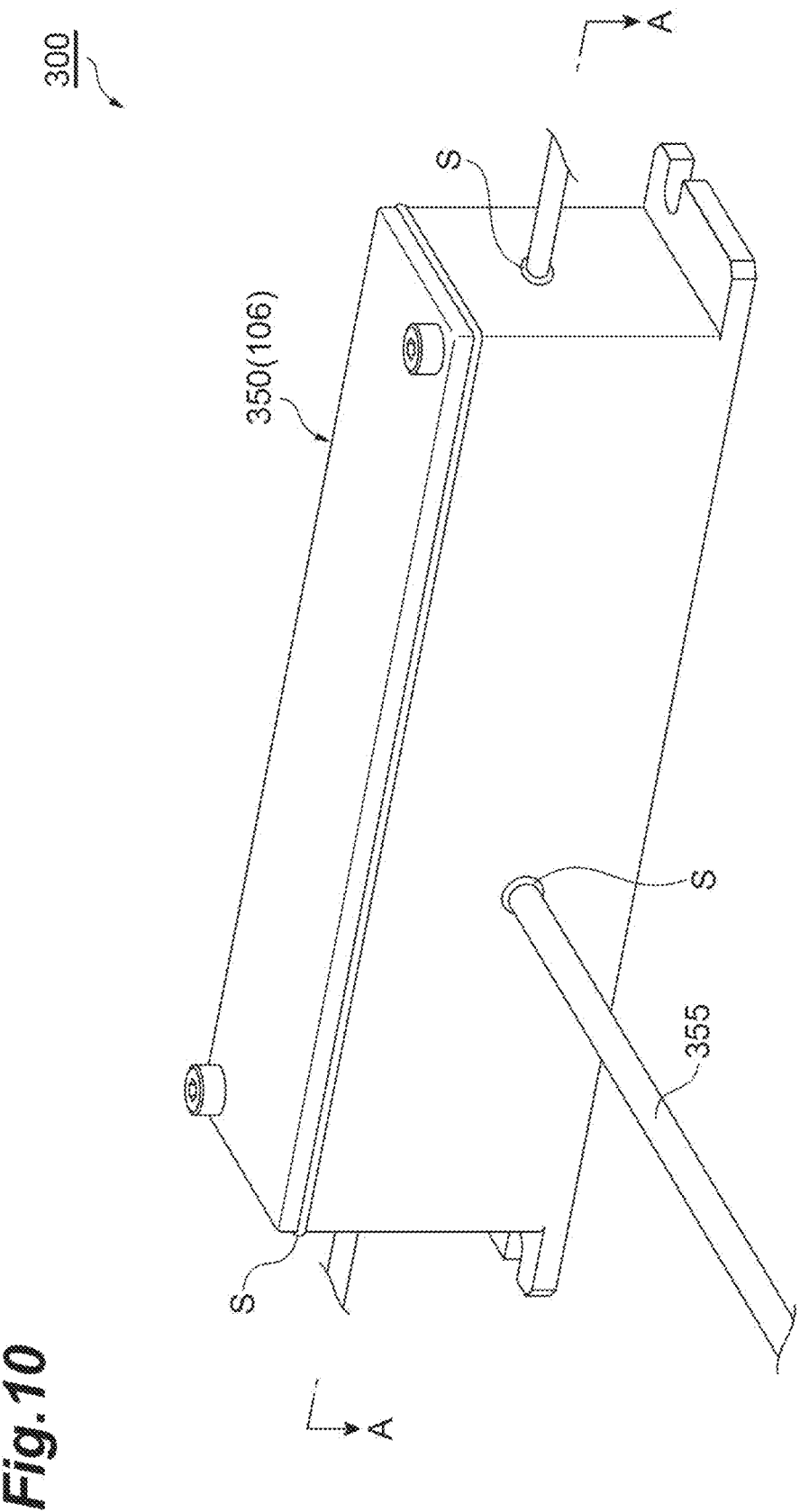
FIG. 10 is a perspective view illustrating a fiber structure according to a third embodiment.
Figure 11:
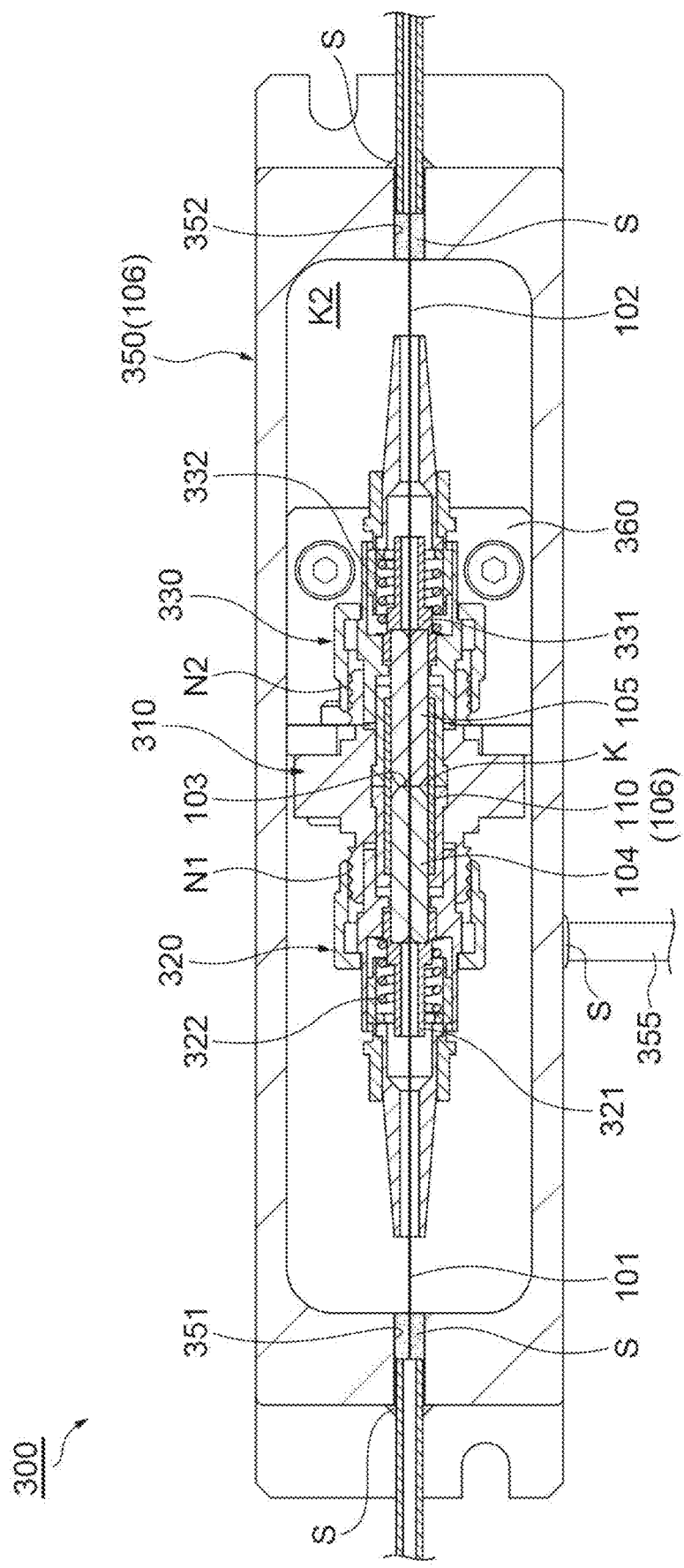
FIG. 11 is a cross-sectional view taken along line A-A of FIG. 10.

As illustrated in FIGS. 10 and 11, a fiber structure 300 of the present embodiment includes an adapter portion 310, a first connector portion 320, and a second connector portion 330. The fiber structure 300 includes an outer case (third housing) 350 as the housing 106.

The adapter portion 310 accommodates the sleeve 110. The first optical fiber 101 and the first ferrule 104 are inserted into the sleeve 110 from one end side, and the second optical fiber 102 and the second ferrule 105 are inserted into the sleeve 110 from the other end side. As a result, the adapter portion 310 is provided around the end portions (butting parts) of the first and second optical fibers 101 and 102. The saturable absorber 103 is disposed between the first optical fiber 101 and the second optical fiber 102 in the sleeve 110. A screw portion N1 for attaching the first connector portion 320 is provided in the end portion of the adapter portion 310 on the first optical fiber 101 side. A screw portion N2 for attaching the second connector portion 330 is provided in the end portion of the adapter portion 310 on the second optical fiber 102 side.

The first connector portion 320 is a member that connects the first optical fiber 101 to the adapter portion 310. The first connector portion 320 is detachably connected to the adapter portion 310 via the screw portion N1. The first connector portion 320 includes the first ferrule 104, a first ferrule holding portion 321, and a first spring portion 322.

The first ferrule holding portion 321 holds the first ferrule 104. The first ferrule holding portion 321 has a circular tube shape and is coaxially attached to the base end side of the first ferrule 104. The inner portion of the first ferrule holding portion 321 communicates with the inner portion of the first ferrule 104. The first spring portion 322 is a coil spring. With the first connector portion 320 connected to the adapter portion 310, the first spring portion 322 uses its elastic force to press the first ferrule holding portion 321 to the second optical fiber 102 side and press the end portion of the first optical fiber 101 to the second optical fiber 102 side. The pressing force of the first spring portion 322 is, for example, approximately 1 kgf.

The second connector portion 330 is a member that connects the second optical fiber 102 to the adapter portion 310. The second connector portion 330 is detachably connected to the adapter portion 310 via the screw portion N2. The second connector portion 330 includes the second ferrule 105, a second ferrule holding portion 331, and a second spring portion 332.

The second ferrule holding portion 331 holds the second ferrule 105. The second ferrule holding portion 331 has a circular tube shape and is coaxially attached to the base end side of the second ferrule 105. The inner portion of the second ferrule holding portion 331 communicates with the inner portion of the second ferrule 105. The second spring portion 332 is a coil spring. With the second connector portion 330 connected to the adapter portion 310, the second spring portion 332 uses its elastic force to press the second ferrule holding portion 331 to the first optical fiber 101 side and press the end portion of the second optical fiber 102 to the first optical fiber 101 side. The pressing force of the second spring portion 332 is, for example, approximately 1 kgf.

The outer case 350 internally accommodates the adapter portion 310, the first connector portion 320, and the second connector portion 330. The space between the lid and the housing constituting the outer case 350 is bonded and sealed by the sealing material S (see FIG. 10). The outer case 350 can be packaged by internally accommodating the adapter portion 310 as it is with the first connector portion 320 and the second connector portion 330 connected to the adapter portion 310.

The outer case 350 has an elongated and rectangular box shape. A space K2 is formed in the outer case 350. The space K2 of the outer case 350 is in an airtight state. The space K2 is defined by the inner surface of the outer case 350. The space K2 in the outer case 350 includes the saturable absorber 103. The space K2 constitutes the space around the saturable absorber 103. The space K2 includes the space K in the sleeve 210. The adapter portion 310 is fixed to the space K2 via a bracket 360.

Through holes 351 and 352 communicating with the space K2 are formed along the longitudinal direction in the outer case 350. The covering portion of the first optical fiber 101 is inserted in the through hole 351. The covering portion of the second optical fiber 102 is inserted in the through hole 352.

A second tip tube 355 extending along a direction intersecting with the longitudinal direction is joined to the outer case 350. The second tip tube 355 communicates with the space K2. The second tip tube 355 is a glass or metal tube used when gas is discharged from the space K2 (the space K2 is vacuumized) and when the space K2 is filled with an inert gas or liquid. The second tip tube 355 is blocked such that the space K2 is in an airtight state.

The space between the outer case 350 and the first optical fiber 101 is bonded and sealed by the sealing material S. The sealing material S between the outer case 350 and the first optical fiber 101 is also applied to the inside of the through hole 351. The space between the outer case 350 and the second optical fiber 102 is bonded and sealed by the sealing material S. The sealing material S between the outer case 350 and the second optical fiber 102 is also applied to the inside of the through hole 352. The space between the outer case 350 and the second tip tube 355 is bonded and sealed by the sealing material S.

As described above, the life of the saturable absorber 103 can be sufficient and the durability can be enhanced also in the fiber structure 300.

The fiber structure 300 includes the adapter portion 310 and the first connector portion 320. The first spring portion 322 of the first connector portion 320 presses the end portion of the first optical fiber 101 to the second optical fiber 102 side. As a result, the thermal diffusion of the saturable absorber 103 sandwiched between the first optical fiber 101 and the second optical fiber 102 can be satisfactory, the life of the saturable absorber 103 can be sufficient, and the durability can be enhanced.

The fiber structure 300 includes the second connector portion 330. The second spring portion 332 of the second connector portion 330 presses the end portion of the second optical fiber 102 to the first optical fiber 101 side. As a result, the thermal diffusion of the saturable absorber 103 sand- wiched between the first optical fiber 101 and the second optical fiber 102 can be further satisfactory, the life of the saturable absorber 103 can be further sufficient, and the durability can be further enhanced.

The housing 106 of the fiber structure 300 has the outer case 350 internally accommodating the adapter portion 310, the first connector portion 320, and the second connector portion 330. The outer case 350 is provided with the second tip tube 355 communicating with the space K2 including the saturable absorber 103 in the outer case 350. As a result, the space K2 including the saturable absorber 103 can be made airtight with the adapter portion 310 and the first and second connector portions 320 and 330 accommodated in the outer case 350 as they are. In addition, gas or liquid outflow from the airtight space K2 including the saturable absorber 103 or gas or liquid inflow to the airtight space K2 including the saturable absorber is possible via the second tip tube 355.

As described above, in the fiber structure 300, the entire adapter portion 310 to which the first and second connector portions 320 and 330 are connected can be disposed in the outer case 350.

Fourth Embodiment

Next, a fourth embodiment will be described. Differences from the second embodiment will be described in the description of the present embodiment.

Figure 12:
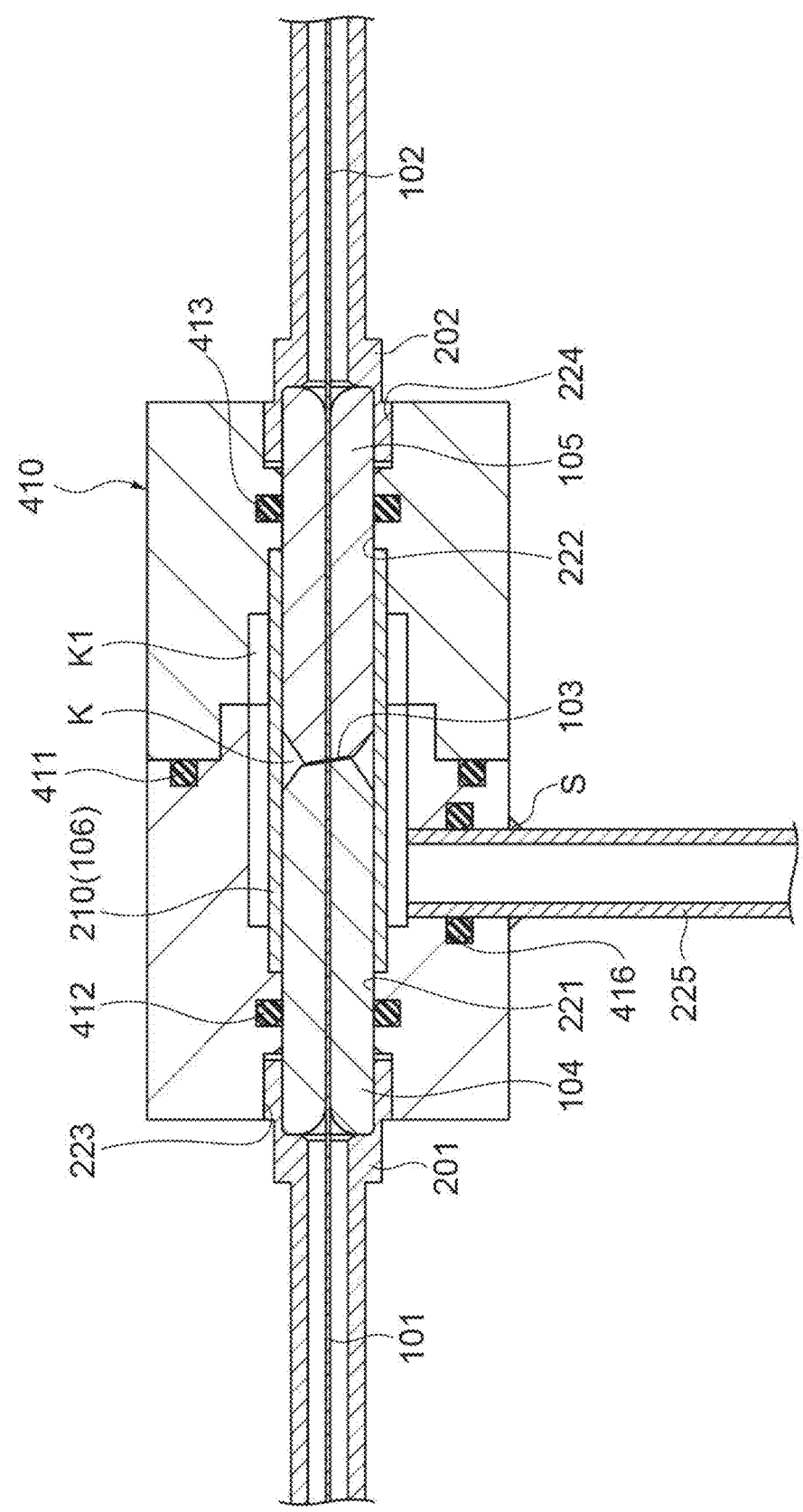
FIG. 12 is a cross-sectional view illustrating a fiber structure according to a fourth embodiment.

As illustrated in FIG. 12, a fiber structure 400 of the present embodiment has a package 410 as the second housing instead of the package 220 (see FIG. 6). The package 410 has a divided structure in which a plurality of members are fitted together. The fitting part is sealed by an airtight O-ring 411. The space between the package 410 and the first ferrule 104 is sealed by an airtight O-ring 412. The space between the package 410 and the second ferrule 105 is sealed by an airtight O-ring 413. The space between the package 410 and the first tip tube 225 is sealed by the sealing material S and an airtight O-ring 416. The other configurations of the package 410 are the same as those of the package 220.

As described above, the life of the saturable absorber 103 can be sufficient and the durability can be enhanced also in the fiber structure 400.

In the fiber structure 400, the space between the package 410 and the first ferrule 104 and the space between the package 410 and the second ferrule 105 are sealed by the airtight O-rings 412 and 413. The space between the package 410 and the first tip tube 225 is sealed by the sealing material S and the airtight O-ring 416. In this case, the airtight state of the space K1 (space K) including the saturable absorber 103 can be reliably realized by means of the airtight O-rings 412, 413, and 416. It is possible to realize a structure using a small amount of adhesive or sealing material and improve assembly workability. It should be noted that the space between the package 410 and the first tip tube 225 may be sealed only by the airtight O-ring 416 (the entire sealing structure of the fiber structure 400 may be realized by an airtight O-ring). The space between the package 410 and the first tip tube 225 may be sealed only by the sealing material S.

As described above, one aspect of the present invention is not limited to the embodiments described above and may be modified or applied to another without changing the gist described in each claim.

The shape of each element in one aspect of the embodiments described above is not particularly limited and may vary. One aspect of the present invention can also be regarded as a fiber structure production method, a pulse laser device production method, and a supercontinuum light source production method. In each of the embodiments described above, at least a part of the configuration of another embodiment may be appropriately combined.

In the embodiments described above, at least one of the spaces between the sleeves 110 and 210 and the first ferrule 104 in which the first optical fiber 101 is inserted, between the sleeves 110 and 210 and the second ferrule 105 in which the second optical fiber 102 is inserted, between the packages 220 and 410 and the first ferrule 104 in which the first optical fiber 101 is inserted, between the packages 220 and 410 and the second ferrule 105 in which the second optical fiber 102 is inserted, and between the packages 220 and 410 and the first tip tube 225 may be welded. In this case, the airtight state of the spaces K, K1, and K2 can be reliably realized by welding.

Figure 13:
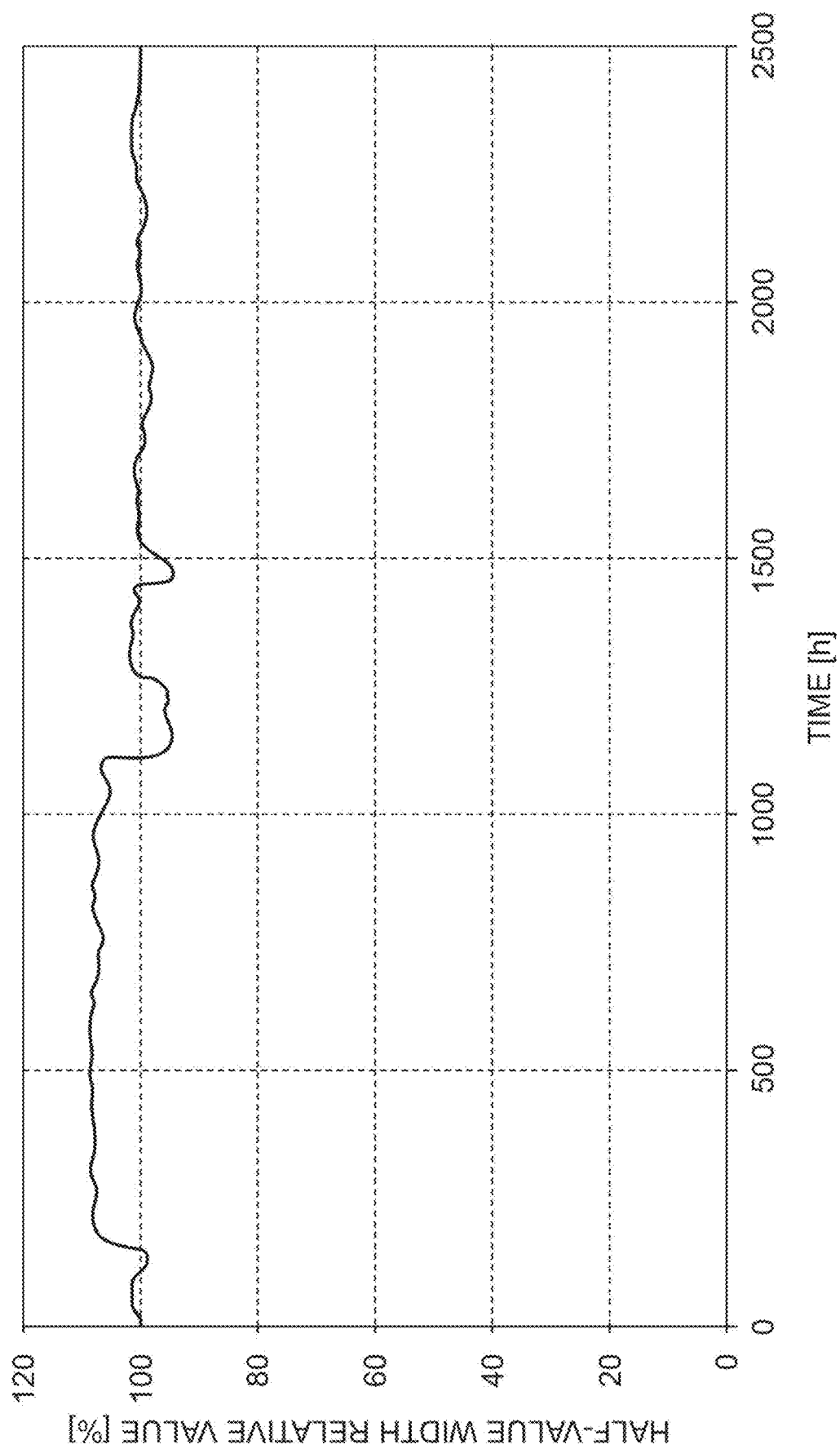
FIG. 13 is a graph showing a durability test result pertaining to the fiber structure according to the embodiment.

FIG. 13 is a graph showing a durability test result pertaining to the fiber structure according to the embodiment. The horizontal axis and the vertical axis in the drawing are the same as those in FIG. 5. As shown in FIG. 13, the performance data pertaining to the fiber structure shows that the performance can be maintained for 2,500 hours or more. It can be confirmed that the durability and the life characteristics can be significantly improved by means of the fiber structure according to the embodiment.

REFERENCE SIGNS LIST

1: supercontinuum light source, 10: pulse laser device, 100, 200, 300, 400: fiber structure, 101: first optical fiber, 102: second optical fiber, 103: saturable absorber, 104: first ferrule, 105: second ferrule, 106: housing, 110, 210: sleeve (first housing), 220, 410: package (second housing), 225: first tip tube, 310: adapter portion, 320: first connector portion, 322: first spring portion, 330: second connector portion, 332: second spring portion, 350: outer case (third housing), 355: second tip tube, 411, 412, 413, 416: airtight O-ring, K, K1, K2: space, S: sealing material.

The invention claimed is:

1. A fiber structure comprising:
first and second optical fibers disposed such that end portions thereof butt;
a first ferrule in which the first optical fiber is inserted;
a second ferrule in which the second optical fiber is inserted;
a sheet-shaped saturable absorber including a carbon nanotube disposed between the end portion of the first optical fiber and the end portion of the second optical fiber;
a housing internally accommodating the end portion of the first optical fiber and the end portion of the second optical fiber; and
a space defined by an inner surface of the housing, the end portion of the first optical fiber, an end portion of the first ferrule, the end portion of the second optical fiber, and an end portion of the second ferrule, wherein
the space includes a portion where the saturable absorber is disposed, and a cavity portion where the saturable absorber is not disposed, the cavity portion being formed by the end portion of the first ferrule and the end portion of the second ferrule being spaced from the inner surface of the housing, and
the space is airtight.

2. The fiber structure according to claim 1, wherein the housing has a first housing, and the first housing is formed of zirconia and has a tubular shape.

3. The fiber structure according to claim 2, wherein a space between the first housing and the first ferrule in which the first optical fiber is inserted and a space between the first housing and the second ferrule in which the second optical fiber is inserted are sealed by a sealing material.

4. The fiber structure according to claim 1, wherein
the housing has a second housing, and
the second housing is provided with a first tip tube communicating with the space in the second housing including the saturable absorber,
wherein the first tip tube is sealed upon forming the space airtight.

5. The fiber structure according to claim 4, wherein a space between the second housing and the first ferrule in which the first optical fiber is inserted, a space between the second housing and the second ferrule in which the second optical fiber is inserted, and a space between the second housing and the first tip tube are sealed by a sealing material.

6. The fiber structure according to claim 4, wherein
a space between the second housing and the first ferrule in which the first optical fiber is inserted and a space between the second housing and the second ferrule in which the second optical fiber is inserted are sealed by an airtight O-ring, and
a space between the second housing and the first tip tube is sealed by at least one of a sealing material and an airtight O-ring.

7. The fiber structure according to claim 4, wherein the second housing is formed of stainless steel, an aluminum alloy, or a copper alloy.

8. The fiber structure according to claim 3, wherein the sealing material is an epoxy adhesive for vacuum airtightness, solder, or a brazing material.

9. The fiber structure according to claim 2, wherein at least one of a space between the first housing and the first ferrule in which the first optical fiber is inserted and a space between the first housing and the second ferrule in which the second optical fiber is inserted is welded.

10. The fiber structure according to claim 4, wherein at least one of a space between the second housing and the first ferrule in which the first optical fiber is inserted, a space between the second housing and the second ferrule in which the second optical fiber is inserted, and a space between the second housing and the first tip tube is welded.

11. The fiber structure according to claim 1, comprising:
an adapter portion provided around the end portion of the first optical fiber and the end portion of the second optical fiber; and
a first connector portion connecting the first optical fiber to the adapter portion,
wherein the first connector portion includes a first spring portion pressing the end portion of the first optical fiber to the second optical fiber side.

12. The fiber structure according to claim 11, comprising a second connector portion connecting the second optical fiber to the adapter portion,
wherein the second connector portion includes a second spring portion pressing the end portion of the second optical fiber to the first optical fiber side.

13. The fiber structure according to claim 11, wherein
the housing has a third housing internally accommodating the adapter portion and the first connector portion, and
the third housing is provided with a second tip tube communicating with the space in the third housing including the saturable absorber.

14. The fiber structure according to claim 1, wherein the saturable absorber contains a sheet-shaped resin material and a plurality of the carbon nanotubes dispersed in the resin material.

15. The fiber structure according to claim 1, wherein the space including the saturable absorber is filled with an inert gas or an inert liquid.

16. The fiber structure according to claim 15, wherein the inert gas is $N_2$ or a rare gas and the inert liquid is a fluorine-based inert liquid.

17. A pulse laser device comprising the fiber structure according to claim 1.

18. A supercontinuum light source comprising the pulse laser device according to claim 17.

* * * * *